May 19, 1925.
R. TRULLINGER
EMERGENCY TIRE
Filed April 30, 1923
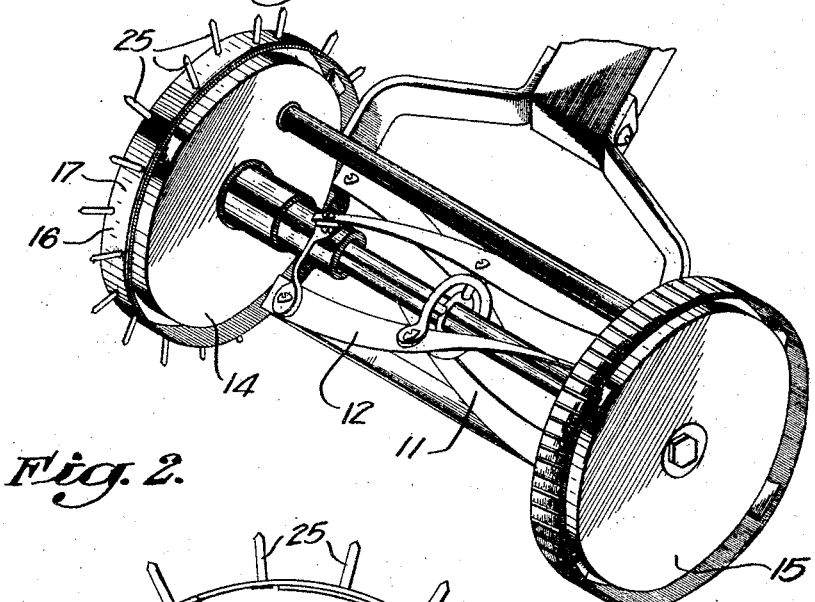
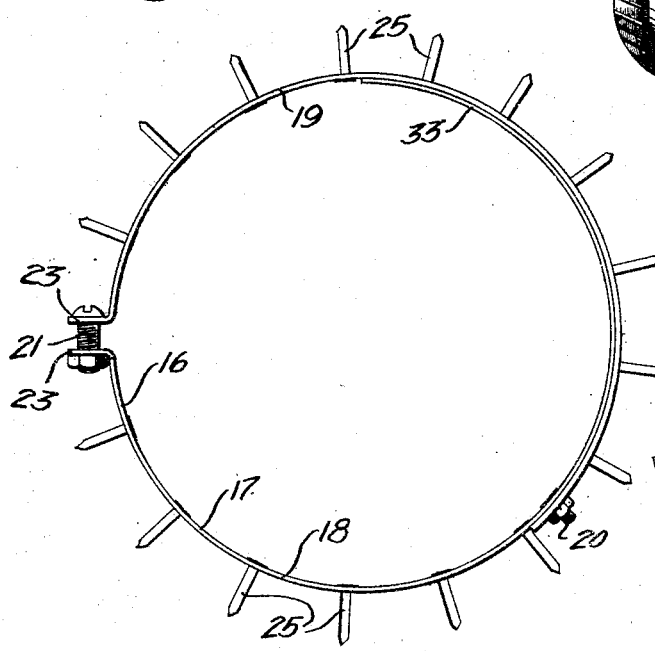
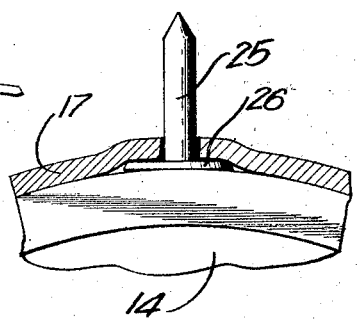
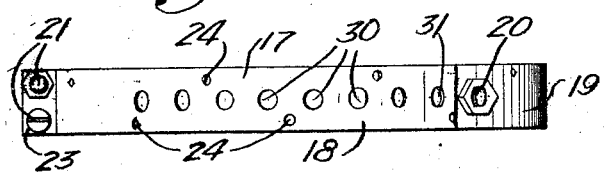
INVENTOR:
RALPH TRULLINGER,
BY
Graham Harris
ATTORNEYS.

Patented May 19, 1925.

1,538,148

UNITED STATES PATENT OFFICE.

RALPH TRULLINGER, OF LOS ANGELES, CALIFORNIA.

EMERGENCY TIRE.

Application filed April 30, 1923. Serial No. 635,560.

*To all whom it may concern:*

Be it known that I, RALPH TRULLINGER, a citizen of the United States, residing at Los Angeles, in the county of Los Angeles and State of California, have invented a new and useful Emergency Tire, of which the following is a specification.

Difficulty is encountered when mowing a lawn having Bermuda or devil grass growing therein, because of the fact that the Bermuda grass, being very tough, will clog the blades of the lawn mower and thereby cause the wheels thereof to slip over the lawn; also if the grass is wet, there is a tendency for the wheels of the mower to slip thereover. This is due to the fact that the wheels of the mower have only frictional engagement with the lawn and therefore develop only a limited amount of traction.

It is an object of the invention to provide an attachment for lawn mowers which will make it impossible for the mower to slip over the grass.

It is also an object to provide an attachment of this character which is mounted on one wheel of a lawn mower and which causes penetrating engagement between the wheel and the lawn.

It is another object of the invention to provide a wheel attachment which is adjustable so that it may be adjusted to different sizes of wheels.

It is a still further object to provide an attachment of this character which may be very cheaply manufactured.

The invention consists essentially of a band member which is clamped to the circumference of the drive wheel of a lawn mower and which has holes punched therein through which spike members extend radially, the heads thereof being clamped between the band member and the periphery of the wheel, thereby retaining them rigidly in place. The band member being made in two portions which are bolted together, may be easily adjusted to suit differently sized wheels by merely bringing a hole provided in one portion of the band member into coincidence with one of the holes provided for this purpose in the other portion of the band member and then extending the bolt therethrough.

Further objects of the invention and additional advantages thereof will be made evident hereinafter.

Referring to the drawings which are for illustrative purposes only:

Fig. 1 is a perspective view of a lawn mower having an attachment which embodies the features of my invention secured to one of the drive wheels thereof.

Fig. 2 is a face view of the spike band attachment.

Fig. 3 is a plan view of the spike band attachment, the spikes being eliminated in this figure for clearness.

Fig. 4 is an enlarged fragmentary view illustrating the manner in which the head of one of the spike members is clamped between the rim of the wheel and the band member.

As shown in Fig. 1, the lawn mower to which my invention is applied is represented by the numeral 11 and has cutting blades 12, and wheels 14 and 15. Shown mounted on the driving wheel of the mower is a spike band attachment which, as a complete unit, is indicated generally by the reference numeral 16 and which embodies the features of my invention.

As shown in the remaining figures of the drawing, my invention provides a band member 17 consisting of portions 18 and 19 which are bolted together by the bolt 20; the band 17 is also provided with bolts 21 which extend through the outwardly extending flanges 23 thereof for clamping the member 17 on the periphery of the wheel 14. Through holes 24, of staggered arrangement, punched in the band 17 are extended spike members 25 which extend radially outward. As shown in Fig. 4, when the member 17 is tightly clamped on the wheel 14 by means of the bolts 21 provided for this purpose, the head 26 of each spike 25 is rigidly held between the band member 17 and the rim of the wheel 14, and thereby substantially holds it in position.

In the portion 18 is provided a multiplicity of adjustment holes 30, which facilitate the adjustment of the band 17 to any size of wheel. For instance, let us suppose that the member 16 as shown is slightly small for the wheel it is to be used on; the bolt 20 is first removed from place, then one of the holes 30 which is near the end of the member 18 is made to coincide with the hole 31 in the end of the member 19 and the bolt extended therethrough. As shown in Fig. 2, the end 33 of the portion 18 may be of considerable length and, owing to the fact that the end fits very conveniently inside the portion 19, may be provided with quite a number of adjustment holes 30.

It will be readily perceived that by equipping a mower with an attachment of my invention, it will be impossible under ordinary conditions for the blades to clog, or if the grass is wet, for the wheels thereof to slip over the grass and not turn, owing to the fact that the spike members penetrate the surface of the lawn and thereby produce a very substantial traction therewith.

From the foregoing, it will be recognized that my invention may be very cheaply manufactured owing to the fact the bolts and spike members are standard articles. The spike members may be any spike or nail of common manufacture, and it will be seen that the band member portions are the only parts which need be made special, these being cheaply stamped from band iron.

I claim as my invention:

1. In an attachment for a lawn mower wheel, the combination of: a band adapted to be clamped around the periphery of a lawn mower wheel, said band consisting of two overlapping portions adjustably secured together and having a plurality of holes therein, said portions having outwardly turned flanges through which bolts are extensible to constrict the band upon said wheel; and engagement members projecting radially outwardly through said holes.

2. In an attachment for a lawn mower wheel, the combination of: a band adapted to be clamped around the periphery of a lawn mower wheel, said band consisting of two overlapping portions adjustably secured together and having a plurality of holes therein, said portions having outwardly turned flanges through which bolts are extensible to constrict the band upon said wheel; and spikes projecting outwardly through said holes, the heads of some of said spikes being gripped between said band and the face of said wheel.

In testimony whereof, I have hereunto set my hand at Los Angeles, California, this 17th day of April, 1923.

RALPH TRULLINGER.